Aug. 24, 1954        H. H. J. BENSON, JR., ET AL        2,686,979
INSTRUMENT FOR NONFLYING AIRCRAFT TRAINERS
Filed Aug. 11, 1953                                    2 Sheets-Sheet 1
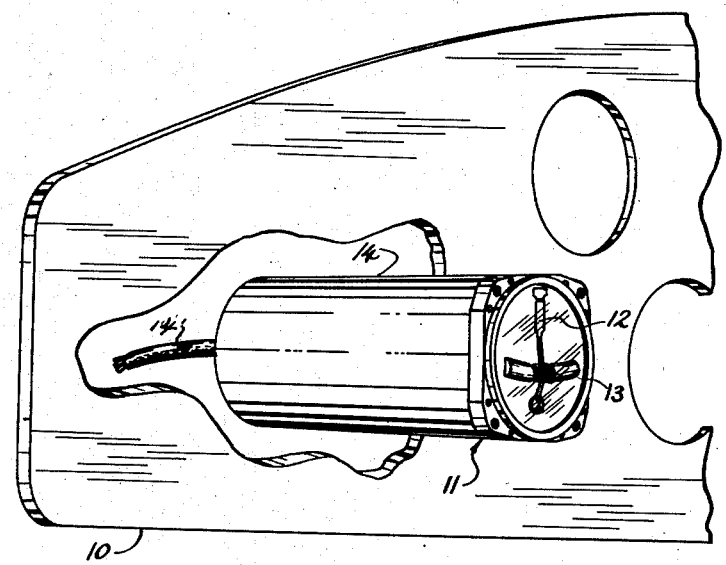
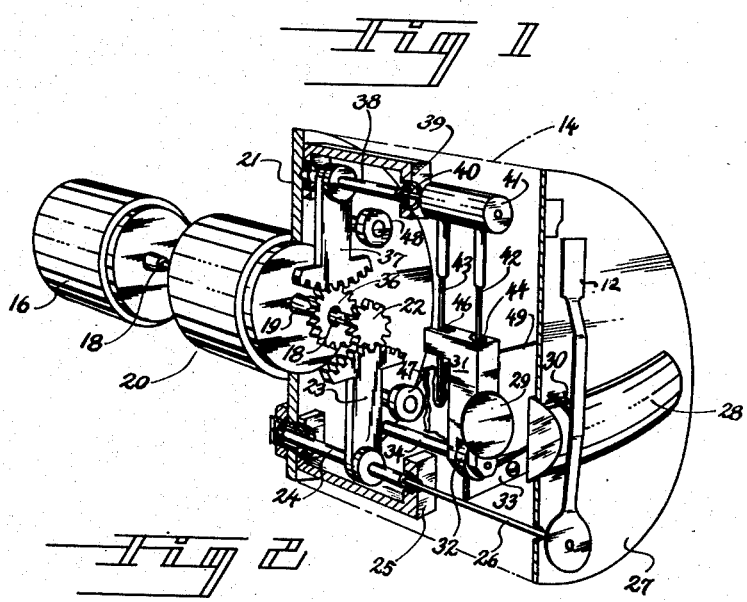
INVENTOR
Howard H. J. Benson, Jr.
Joseph B. Imbriaco
BY Scrivener and Parker
ATTORNEYS Aug. 24, 1954  H. H. J. BENSON, JR., ET AL  2,686,979
INSTRUMENT FOR NONFLYING AIRCRAFT TRAINERS
Filed Aug. 11, 1953  2 Sheets-Sheet 2

INVENTORS
Howard H. J. Benson, Jr.
Joseph B. Imriaco
BY Scrivener and Parker
ATTORNEYS Patented Aug. 24, 1954

2,686,979

UNITED STATES PATENT OFFICE 2,686,979

INSTRUMENT FOR NONFLYING AIRCRAFT TRAINERS

Howard H. J. Benson, Jr., Hyattsville, and Joseph B. Imbriaco, Landover, Md., assignors to The Engineering and Research Corporation, Riverdale, Md., a corporation of Maryland Application August 11, 1953, Serial No. 373,572

4 Claims. (Cl. 35—12)

This invention relates to non-flying aircraft trainers and more particularly to an improved turn-and-back indicator for use in such trainers.

In the co-pending application Serial No. 365,114 filed on June 30, 1953, by James F. Dement, Joseph B. Imbriaco, Howard H. J. Benson, Jr., and Morris Ackerman, and owned by the same assignee as the present application, there is described and illustrated a turn-and-back instrument for non-flying aircraft trainers which included a ball-bank indicator which faithfully simulated in action and appearance that type of indicator having a freely movable ball enclosed in an arcuate fluid-filled tube as employed in actual aircraft. Certain subject matter disclosed in the instant application is broadly claimed in the aforesaid prior application.

As well-known, pilots flying aircraft having this type of bank indicator endeavor to retain the ball in its central position throughout the flight and particularly while executing a co-ordinated turn movement. A co-ordinated turn movement is one in which, by conjoint use of rudder and aileron controls, the degree of bank and rate of turning are so coordinated that the force of gravity tending to move a body towards the down-wing side of the aircraft during the bank is exactly off-set by the centrifugal force tending to move the body towards the up-wing side of the aircraft. Thus when a turn is properly co-ordinated the ball in a bank indicator of the type described remains in a central neutral or stable position but whenever the controls are not properly co-ordinated the ball moves away from the central to an unstable position which the pilot must correct by properly manipulating the controls until the ball again returns to its central stable position.

In non-flying aircraft trainers, where the natural ball-displacing forces of an actual aircraft in flight are necessarily absent, the above described effects have been reproduced in a variety of fashions, the most common utilizing a rocking tube to position the ball therein through the action of gravity alone, the tube being rocked in proportion to simulated ball-displacing forces resulting from trainee actuation of flight controls. This instrument is not satisfactory because, when the trainee has become familiar with the rocking tube and ball of the trainer, an entirely foreign situation confronts him when he encounters the actual instruments in an aircraft. Another method in frequent use employs a sphere or disc attached to a rod rotatably suspended from a pivot coinciding with the center point of the curve of an arcuate open slot in the dial face, the slot being the same size as an actual arcuate tube. Since the radius of such a tube substantially exceeds the dimensions of the dial face in which it is usually set, ball-bank simulators of the last named type require that the ball-simulating body be suspended from a point on the rear of the instrument panel substantially above the dial face in order that the body will always be in registry with the slot throughout its entire range of movement. This arrangement is unsatisfactory in that the operating mechanism for the ball simulating body is separately mounted from the dial face so that repairs or adjustments to the bank-indicator simulator must be done in the trainer itself resulting in frequent and extended periods of inactivity which could otherwise be utilized for pilot training. Furthermore, as far as is known, in ball-bank simulators of this type, no attempt has been made to reproduce the appearance of the liquid-filled tube which would confront the pilot in an actual aircraft.

The ball-bank indicator simulator of our co-pending application eliminated all the shortcomings of the prior art by providing an arcuate lens member mounted in the dial face and having an exposed surface that accurately reproduced the appearance of an actual liquid-filled tube. The ball for such a tube was reproduced by a ball-simulating body secured to a carriage mounted for movement behind the lens on arcuate tracks concentric with the arc of the lens so that during movement of the carriage the ball simulating body was at all times in registry with the lens and therefore visible therethrough without distortion, regardless of the carriage's position. The bank indicator simulator operating mechanism was entirely enclosed in a housing having substantially the same diameter as the dial face, novel means being provided for moving the carriage on the arcuate tracks whose radius, as above explained, greatly exceeded the dimensions of the instrument case. To accomplish this the carriage was provided with three flanged wheels, two of which engaged an upper track member and the third of which engaged a lower track member. The carriage was provided with a rearwardly projecting rod having a vertical portion which was slidingly engaged by a forwardly projecting slotted member having a vertical portion whose end was fixedly pivoted at a convenient location within the confines of the instrument case. Means including an electric motor, energized in accordance with simulated ball-displacing forces, and suitable gearing was provided for rotating the slotted member about its pivot thereby moving the carriage on the aforesaid arcuate tracks. As the carriage approached the ends of the track the vertical distance between the pivot of the slotted member and the carriage increased due to the difference in curvature between the relatively flat arc of the tracks and the quite sharp arc described by the slotted member during rotation thereof. The vertical end of the rod, however, was sufficiently long so that as the distance between the pivot and carriage was increased, the rod, in effect, telescoped outwardly with respect to the slot thereby accomplishing carriage movement in the manner above described. Furthermore, the ball-bank indicator simulator of the co-pending application could be readily removed as a unit for repairs and adjustments and another inserted in its place with but slight interruption in pilot training activity.

Through the invention of the co-pending application was entirely satisfactory from an operational standpoint and adequately overcame all the short-comings of the prior art, it was found to be complicated and expensive to manufacture. The present invention improves on our prior invention by providing a novel carriage driving means which requires the use of only one track instead of two and requires but one wheel for engaging the track instead of the three of the co-pending application. Hence one of the principal objects of this invention is the provision of a new and improved means for actuating the ball-simulating means of simulated turn-and-bank indicator for non-flying aircraft trainers.

Another object of the invention is to provide in a simulated turn-and-bank indicator of the type described, a ball-bank instrument which faithfully simulates the action of the actual instruments employed in actual aircraft.

Yet another object of the invention is to provide a ball-bank instrument simulator which is accurate in operation, simple in construction and inexpensive to manufacture.

A more specific object of the invention is to provide in ball-bank indicator simulators utilizing a lens member simulating an arcuate liquid-filled tube and a ball-simulating body movably mounted behind said lens, an improved means for actuating the ball-simulating body in response to simulated ball-displacing forces resulting from trainee-actuation of flight controls.

Other objects and their attendant advantages will become apparent as the following detailed description is read in conjunction with the accompanying drawings wherein, Fig. 1 is a perspective view of an instrument panel of a non-flying aircraft trainer with parts thereof broken away showing the simulated turn-and-bank indicator of the present invention as it may appear to a pilot-trainee;

Fig. 2 is an enlarged perspective view, partly in section, and with parts broken away, of the present invention with the outer case thereof removed;

Figure 3:
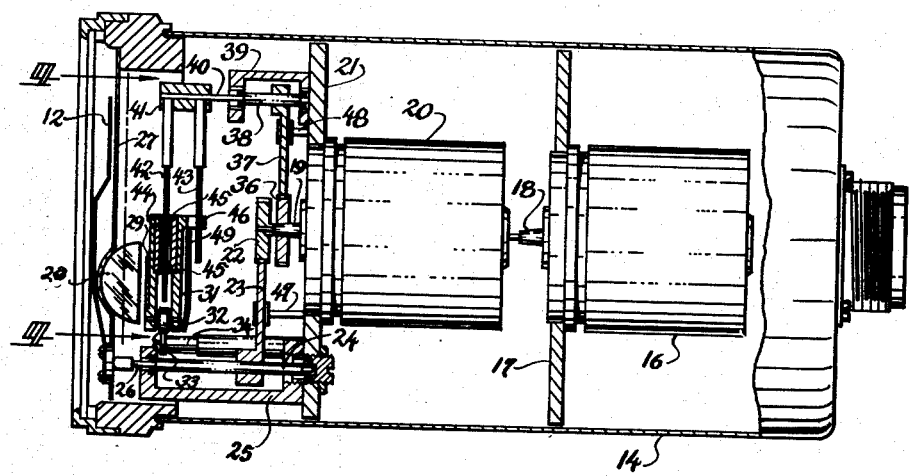
Fig. 3 is a side view, partly in section and partly in elevation, of the indicator of the present invention.

Referring now to Fig. 1, the numeral 10 designates an instrument panel of a non-flying aircraft trainer which is suitably apertured for supporting a plurality of instruments as normally employed in aircraft and including a turn-and-bank indicator 11 of the type having a pointer 12 to indicate the direction of turn and a bank indicator 13 for informing the pilot of the lateral attitude of the aircraft.

The turn-and-bank indicator operating mechanism may be enclosed within a suitable housing 14 and may comprise electrical motors and linkages hereafter described in detail. The electrical driving devices may receive the required energization through cable 14' from remote sources (not shown) which in turn receive electrical control signals from trainee-operated mechanism, such as rudder and aileron controls, in a manner well-known in the art.

As illustrated in Figs. 2 and 3 the turn-indicator 12 shown may be driven by a motor 16 secured in a mounting plate 17 centrally attached within the housing 14. Motor 16 may be provided with a shaft 18 which extends forwardly through a hollow shaft 19 of an aligned second motor 20 suitably secured in a forward mounting plate 21 in the housing 14. Secured to the forward end of shaft 18 is a pinion gear 22 engaging a sector gear 23 whose lower end is secured to a shaft 24 journaled at its opposite ends in a housing 25 secured to the front face of plate 21. Shaft 24 has an extension 26 which projects forwardly through housing 25 and instrument dial face 27 and has secured to its outer extremity the lower end of the turn pointer 12.

Figure 4:
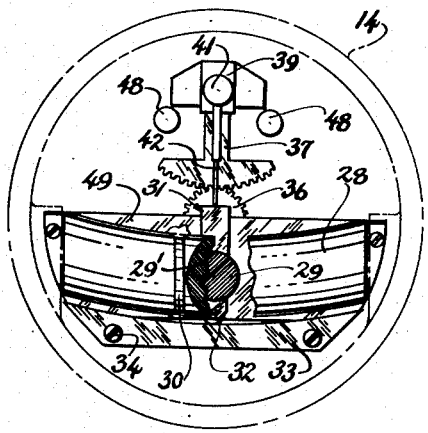
Fig. 4 is a front view of the present invention with parts thereof removed or broken away, taken on a line substantially corresponding to line 4—4 of Fig. 3.

The bank indicator simulator comprises an arrangement of parts which faithfully reproduces in action and appearance a ball-bank indicator of the type having a ball enclosed in a fluid-filled transparent arcuate container. As described in our co-pending application, in place of the latter there is provided an arcuate transparent lens member 28, constructed of suitable material such as glass, clear plastic, or the like, which when viewed from the front, is similar in size and configuration in all respects to the normal liquid-filled tube found in actual aircraft instruments of this type. The lens 28 is secured by any suitable means, such as by bonding at the edges, in a properly formed opening in the dial face 27. Behind the lens 28 there is located in close proximity to the inner side thereof a ball-simulating body 29 which may be of such size and shape that, when viewed through the lens, reproduces in size and configuration the appearance of a normal ball in a conventional liquid-filled tube. This effect is illustrated in Fig. 4 in which a portion of lens 28 is broken away to show the relationship between the actual body 29 and the image 29' thereof as distorted by the lens. As in actual aircraft instruments, the image of the ball-simulating body may have a substantially elliptical shape, and the pilot or trainee endeavors to maintain the ball or simulated ball in a central position between guide markers 30 throughout the flight, and especially while executing a co-ordinated turn as previously explained, movement of the ball from its central position being an indication to the pilot of unstable flight conditions.

The ball-simulating body 29 which is preferably in the form of a flat disc, is secured to the forward face of an inverted L-shaped carriage member 31, which is slotted at its lower end to receive a wheel 32 the periphery of which engages the upper arcuate edge of a track 33 which extends laterally of the instrument and is secured in spaced relationship with respect to the inner side of dial face 27 by suitable spacer screws 34 attached to plate 21. As in our co-pending application, the arcuate edge of track 33 is concentric with and has the same degree of curvature as the lens 28 whereby the ball-simulating body 29 remains aligned with and behind the lens 28 throughout the entire range of movement of the carriage 31. Since it is apparent that the radii determining the curvature of track member 33 and lens 28 exceed the dimensions of the instrument case 14, novel means are provided within the case itself for moving the carriage 31 along the track 33 and this means will now be described.

As particularly illustrated in Figs. 2 and 3, bank-indicator motor 20 has affixed to the shaft 19 thereof a pinion 36 engaging a sector gear 37 fixed at its upper end to a shaft 38 which is rotatably mounted in a bearing block 39 secured to the upper forward face of mounting plate 21. The shaft 38 has a forwardly extending projection 40 having fixed to its outer end a block 41 of any suitable shape. Extending radially from the bottom of block 41 are a pair of parallel longitudinally spaced smooth vertical rods 42 and 43. As best shown in Fig. 3, forward rod 42, which may be referred to as a guide rod, enters an axially drilled bore of a bearing block 44 secured in a suitable recess in the upper portion of the hollow carriage 31. Bearings 45 which are preferably of the jewel type, are provided at the upper and lower ends of block 44 and have sliding contact with rod 42. The rear rod 43, which may be referred to as a driving rod, is embraced by the sides of a slot 46 in the upper rear projection of the carriage 31. Inasmuch as the relatively flat arc of the track 33 greatly exceeds the quite sharp arc that would be described by the rods 42 and 43 were their length equal to the distance between their pivot and the top of carriage 31 when it is located in its central position, it should be apparent that as carriage 31 is moved to an end of the track 33, the distance between the aforesaid pivot and the top of carriage 31 must increase. Rods 42 and 43, however, are sufficiently long so that as the distance between their pivot and the carriage increases as described, the rods telescope outwardly with respect to the drilled passage 44 and slot 46 of the carriage to allow for the increased distance.

On the forward face of plate 21 and on each side of the respective sector gears 23 and 37, suitable stops 47 and 48 may be provided to limit the degree of movements of the respective turn and bank instruments. Behind the carriage 31 but in front of the various linkages and gears adjacent the forward face of the plate 21 there may be provided a screen member 49 best shown in Fig. 4. The screen 49 may be secured in any suitable manner to the sides of instrument case 14 and serves to prevent the described apparatus within the case 14 from being unrealistically visible through the lens 28.

The described turn-and-bank indicator simulating device according to the invention operates in the following manner: Pilot-trainee actuation of flight controls or other means which would effect a turning movement of a normal aircraft, generates in the non-flying trainer electrical signals in a well-known manner to energize turn motor 16 and rotate the shaft 18 thereof in respect to the direction of turn. Shaft 18, through pinion 22 and sector gear 23, rotates turn pointer shaft 26 to move turn pointer 12 to the right or left of center position depending on the direction in which the turn is executed.

With reference to the ball-bank indicator, improper pilot actuation of flight controls or other unstable conditions affecting the flight of actual aircraft may result in an incorrect or undesired turn or bank of the aircraft causing the ball of an actual indicator, either by gravity or by centrifugal force, to move from its center position. This effect is reproduced in the present invention through the energization of bank-motor 20 in response to signals simulating these forces which, as in actual aircraft, usually bear a direct relation to the positioning of the flight controls, which positioning can be utilized to generate signals to energize bank motor 20 and cause rotation thereof proportionate to the simulated forces. It should be understood, of course, that other forces causing unstable flight, such as rough air conditions, may be electrically reproduced to energize the motor 20 and its operation, therefore, is not limited only to signals received from the positioning of flight controls. The manner in which these forces are electrically simulated is well-known, reference being made to Patent No. 2,366,603, issued R. C. Dehmel on January 2, 1945, for a typical disclosure thereof.

When bank motor 20 receives a signal representing a simulated ball-displacing force it drives shaft 40 and depending shafts 42 and 43 through pinion 36 and sector gear 37. As shafts 42 and 43 more, the latter engages the appropriate side of slot 46 in carriage 31 to cause lateral movement thereof. During this movement rod 42, while it also acts as a drive rod, guides and supports carriage 31 to retain it properly positioned with respect to track 33 so that wheel 32 rides on the upper surface thereof.

As the carriage 31 approaches the extremities of track 33 the rods 42 and 43 telescope outwardly with respect to carriage 31 to provide for the increased distance between the end of track 33 and the shaft 40 carrying the rods 42 and 43. It will be observed that the longitudinal spacing between these latter members also prevents axial turning of carriage 31 so that the ball-simulating body 29 retains at all times a correct relationship with respect to lens 28 without distortion irrespective of its lateral position. As the carriage 31 is returned to its central position through corrective action of the flight controls by the pilot-trainee, the shafts 42 and 43 telescope inwardly in a manner similar to that described for movement of the carriage away from the central position.

It should now be apparent that the present invention eliminates some of the complexities of the simulator of our co-pending application. It accomplishes, in common with our co-pending application, the movement in a realistic manner of a ball-simulating body by means completely enclosed in a relatively compact housing and entirely eliminates the obstacles to realism in the simulators of the prior art; namely the problem of how a ball or ball-simulator may appear substantially the same to a pilot-trainee as an actual ball in aircraft and yet be movable realistically in substantially the same manner as said actual ball is moved by actual flight-produced ball-displacing forces. Until the inventions of this and the co-pending applications, no means have as yet been provided in the prior art which accomplish these purposes with the simplicity and accurate realism as do our described devices. It should be understood, of course, that only one embodiment of the present invention has been shown and described herein, and it should be apparent to those skilled in the art that the same is susceptible to various modifications without departing from the scope and spirit of the appended claims.

What is claimed is:

1. A ball-bank indicator simulator comprising an instrument case, a dial face secured in said instrument case, an arcuate lens member secured in said dial face, an arcuate track positioned behind said lens and having the same curvature as said lens and being substantially co-extensive therewith, a carriage mounted on said track for movement along it, a ball-simulating body mounted on said carriage in a position to be viewed through said lens, an electric motor mounted in said case, and means driven by said motor for moving said carriage comprising a rotatable shaft driven by said motor and a pair of spaced rods secured to said shaft and extending radially thereof and slidingly engaging said carriage to move the same along the track.

2. A ball-bank indicator simulator comprising an instrument case, a dial face secured in said instrument case, an arcuate lens member secured in said dial face, an arcuate track member positioned behind said lens and having the same curvature as said lens and being substantially co-extensive therewith, a carriage mounted on said track for movement along it, a ball-simulating body mounted on said carriage in a position to be viewed through said lens, a shaft rotatably mounted in said case in the longitudinal plane thereof bisecting the arc of said track, a pair of parallel spaced rods secured to said shaft and extending radially thereof and slidingly engaging said carriage, and means for rotating said shaft in response to simulated unstable flight conditions.

3. The simulated ball-bank indicator as claimed in claim 2 wherein said last named means comprises an electric motor adapted to be driven by electrical signals representing simulated unstable flight conditions, a pinion gear carried by said motor and a sector gear secured to said shaft and engaging said pinion gear.

4. In a ball-bank indicator simulator having an enclosed case, means for moving a ball-simulating body along an arcuate path having a radius exceeding the dimensions of said case comprising, an arcuate track fixed in said case and having the same degree of curvature as said path, a ball-simulating body-carriage mounted for movement on said track, a shaft rotatably fixed in said case over the center point of said track, a pair of spaced rods fixed to said shaft and extending radially thereof and telescopically engaging apertures in said carriage registering with said rods, means for rotating said shaft in response to simulated unstable flight conditions, and means for limiting the movement of said carriage to a predetermined amount on either side of the center of said track.

References Cited in the file of this patent

UNITED STATES PATENTS

| Number | Name | Date |
|---|---|---|
| 2,369,922 | Shamah | Feb. 20, 1945 |
| 2,460,675 | Bourgaize | Feb. 1, 1949 |
| 2,467,412 | Wathen | Apr. 19, 1949 |
| 2,472,888 | Cunningham | June 14, 1949 |
| 2,485,286 | Hayes | Oct. 18, 1949 |